(12) United States Patent
Barber et al.

(10) Patent No.: US 9,746,343 B1
(45) Date of Patent: Aug. 29, 2017

(54) STEERING COMMAND GENERATING SYSTEM, DEVICE, AND METHOD FOR A FORWARD-LOOKING IMAGE CAPTURE DEVICE

(71) Applicant: Rockwell Collins, Inc.

(72) Inventors: Sarah Barber, Cedar Rapids, IA (US); Carlo L. Tiana, Portland, OR (US); Kenneth A. Zimmerman, Sherwood, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 485 days.

(21) Appl. No.: 14/448,018

(22) Filed: Jul. 31, 2014

(51) Int. Cl.
*G01C 23/00* (2006.01)
*H04N 5/247* (2006.01)
*H04N 5/232* (2006.01)

(52) U.S. Cl.
CPC ....... *G01C 23/005* (2013.01); *H04N 5/23296* (2013.01); *H04N 5/247* (2013.01)

(58) Field of Classification Search
CPC .......................... G01C 23/005; H04N 5/23296
See application file for complete search history.

(56) References Cited

U.S. PATENT DOCUMENTS

| | | | |
|---|---|---|---|
| 7,605,719 B1 | 10/2009 | Wenger et al. | |
| 7,961,117 B1 | 6/2011 | Zimmerman et al. | |
| 2008/0243372 A1* | 10/2008 | Bodin | G05D 1/0027 701/23 |
| 2009/0309812 A1* | 12/2009 | Larson | G02B 27/017 345/8 |
| 2012/0026190 A1* | 2/2012 | He | G01C 21/00 345/633 |
| 2012/0133529 A1* | 5/2012 | He | G01C 23/00 340/977 |
| 2013/0204467 A1* | 8/2013 | Spinelli | G08G 5/0039 701/3 |
| 2014/0039734 A1* | 2/2014 | Ramaiah | G01W 1/02 701/14 |
| 2015/0346722 A1* | 12/2015 | Herz | G05D 1/0038 701/2 |
| 2016/0009411 A1* | 1/2016 | Davalos | B64D 47/02 345/156 |

* cited by examiner

*Primary Examiner* — Mehrdad Dastouri
*Assistant Examiner* — Rowina Cattungal
(74) *Attorney, Agent, or Firm* — Daniel M. Barbieri; Donna P. Suchy; Angel N. Gerdzhikov

(57) ABSTRACT

Present novel and non-trivial system, device, and method for generating a steering command for at least one forward-looking image capture device are disclosed. The steering command generating system is comprised of a source of navigation data, an avionics system processor ("ASP") configured to receive the navigation data representative of a wind correction angle ("WCA"); generate steering data as a function of at least the navigation data and representative of a steering command commensurate to an angular difference; and provide the steering data to one or more forward-looking image capture device(s). In another embodiment, the ASP may further receive motion tracking data representative of a head position angular measurement and include the motion tracking data in the function for generating steering data. The angular difference may correspond to the WCA or the measurement of a head position angle.

15 Claims, 3 Drawing Sheets

STEERING COMMAND GENERATING SYSTEM, DEVICE, AND METHOD FOR A FORWARD-LOOKING IMAGE CAPTURE DEVICE

BACKGROUND OF THE INVENTION

Field of the Invention

This invention pertains generally to the field of aircraft display units that display images acquired by forward-looking image capturing devices.

Description of the Related Art

It is well-known that a Synthetic Vision System ("SVS") may generate image data representative of a synthetic, three-dimensional perspective of a heading-based scene in front of the aircraft. When provided to a display system, the synthetic image could be presented on the screen of a display unit. Also, it is well-known that an Enhanced Vision System ("EVS") may generate image data representative of the real-world as an enhanced image of the heading-based scene in front of the aircraft, where such image data has been acquired by one or more fixed or steerable image capture devices. When provided to the display system, the enhanced image could be presented on the screen of the display unit. Also, as disclosed by Wenger et al in U.S. Pat. No. 7,605, 716, image data from both the SVS and EVS may be combined to form a combined SVS-EVS image that could be presented on the display unit.

Unlike the heading-based synthetic image, a track-based synthetic image (i.e., a synthetic image based on the ground track of the aircraft and not the heading) may have an operational advantage when used in conjunction with Highway-in-the-Sky ("HITS") symbology. If the aircraft is flying within the HITS, the will be centered within the track-based synthetic image. The use of the track-based synthetic image could also prevent the unwanted intrusion of the HITS and FPV symbologies into other symbologies (e.g., a speed tape or an altitude tape) when strong crosswinds are present.

The EVS may employ fixed forward-looking image capture devices that are oriented with the heading of the aircraft. When a heading-based SVS image is combined with a heading-based EVS image, there is no misalignment of the images due to crosswinds. When a track-based image is combined with a heading-based image, there is no misalignment of the images if there is no crosswind; however, in the presence of a crosswind, the alignment between the two images may be lost because a track-based image is referenced to the ground track and the heading-based image is referenced to the heading. As such, there will be a misalignment between the two images resulting in an inconsistent and invalid representation of the track-based scene in front of the aircraft.

The ability to position a heading-based image within a track-based image to correct for the misalignment has been disclosed by Barber in U.S. Pat. No. 8,831,798 entitled "Systems and Methods for Positioning a Heading-Based Image within a Track-Based Image and for Generating Steering Commands to a Steerable Forward-Looking Image Capture Device of an Enhanced Vision System," where wind correction angle ("WCA") information was employed in the positioning of the heading-based image within a track-based image.

As stated above, there is no misalignment of the images on the occasion where there is no crosswind. There is a second occasion for which there is no misalignment, and this occurs when the aircraft is on the ground, where ground track and heading are the same. Although the absence of a misalignment of images is favorable, it is not helpful on the occasion when an aircraft is taxiing under low visibility conditions and under which the EVS may be employed to generate an image representative of the scene outside the aircraft that is not visible to a pilot; however, with fixed forward-looking image capture devices, the image is limited to the scene straight ahead of the aircraft. If an aircraft is approaching a taxiway intersection and other aircraft are approaching the same intersection from a different direction (s), the image may not capture the other aircraft if the other aircraft are beyond the field of view of the image capture device(s).

BRIEF SUMMARY OF THE INVENTION

The embodiments disclosed herein present novel and non-trivial systems and methods for generating a steering command for at least one forward-looking, steerable image capture device based on the WCA or head position angle. The steering command could be used to steer the image capture device(s) employed by the EVS to acquire image data and generate an enhanced image that could be displayed to a viewer such as a pilot of an aircraft.

In one aspect, embodiments of the inventive concepts disclosed herein are directed to a system for generating a steering command for at least one forward-looking image capture device is disclosed. The system could be comprised of a source of navigation data, an avionics system processor ("ASP"), and one or more forward-looking image capture devices responsive to and in compliance with a steering command generated by the ASP. In an additional embodiment, the system could be further comprised of a source of motion tracking data. In another embodiment, a system could be comprised of a display system.

In another aspect, embodiments of the inventive concepts disclosed herein are directed to a device for generating a steering command for at least one forward-looking image capture device is disclosed. This device may be comprised of the ASP and may be configured (or programmed) to perform a method of generating a steering command as disclosed herein.

In a further aspect, embodiments of the inventive concepts disclosed herein are directed to a method for generating a steering command for at least one forward-looking image capture device. When properly configured, the ASP may receive the navigation data, generate steering data as a function of at least the navigation data and representative of a steering command commensurate to an angular difference, and provide the steering data to one or more one forward-looking image capture device(s). The ASP may further receive motion tracking data representative of a head position measurement and include the motion tracking data in the function for generating steering data. The navigation data may be representative of a wind correction angle ("WCA") or navigation data representative of aircraft heading and/or ground track from which the WCA may be determined or a head reference position may be determined. The angular difference could be comprised of the WCA or the head position measurement.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
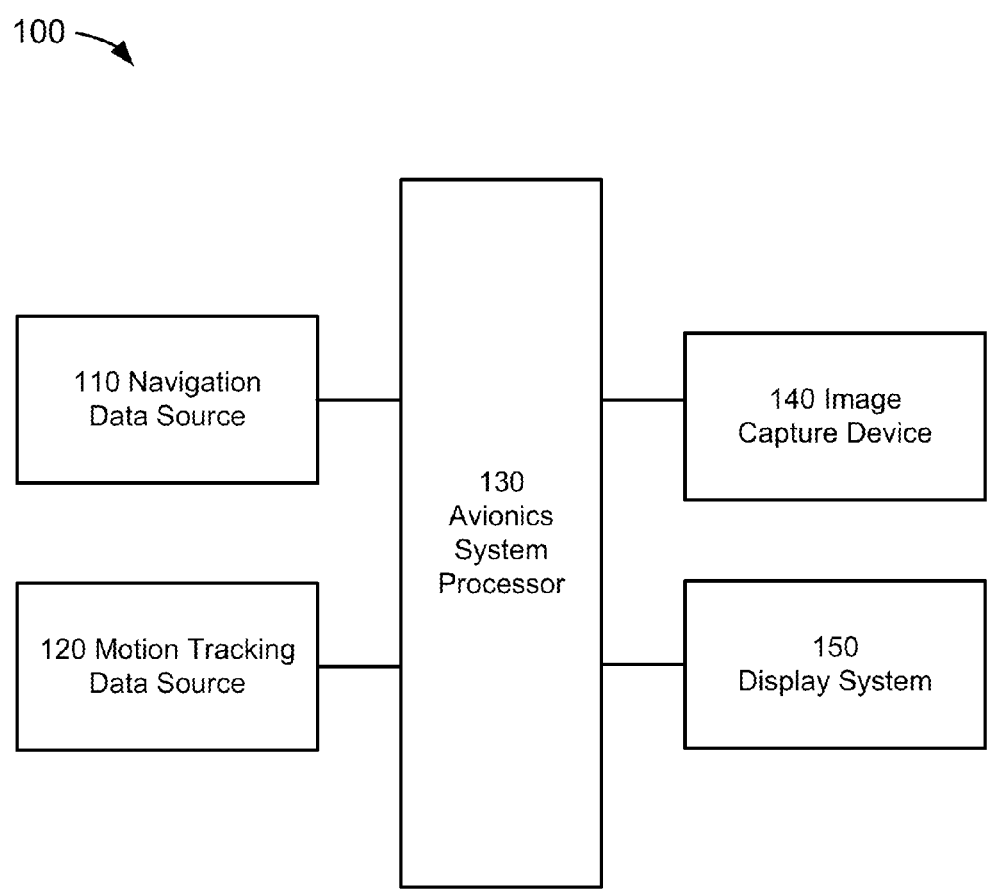
FIG. 1 depicts a block diagram of an embodiment of a system for generating a steering command for at least one forward-looking image capture device.

FIG. 1 depicts a block diagram of an embodiment of a system 100 suitable for implementation of the techniques described herein. The system 100 includes a navigation data source 110, a motion tracking data source 120, an avionics system processor ("ASP") 130, an image capture device 140, and a display system 150.

The navigation data source 110 could include any source (s) which provides data representative of aircraft information, where such information could include, but is not limited to: heading, ground track, wind correction angle information, horizontal position, vertical position, pressure altitude, horizontal velocity (e.g., ground speed), vertical velocity, horizontal position accuracy, vertical position accuracy, horizontal velocity accuracy, vertical velocity accuracy, and/or ownship intended flight path information.

It should be noted that data, as embodied herein for any source or system in an aircraft, including navigation data source 110, may include any analog or digital signal, either discrete or continuous, which could contain information or be indicative of information. As embodied herein, data and signals are treated synonymously. Aircraft could mean any vehicle which is able to fly through the air or atmosphere including, but not limited to, lighter than air vehicles and heavier than air vehicles, wherein the latter may include manned or unmanned fixed-wing and rotary-wing vehicles.

The navigation data source 110 may include, but is not limited to, an air/data system, an attitude heading reference system, an inertial guidance system (or inertial reference system), a global navigation satellite system (or satellite navigation system such as the system commonly referred to as GPS), and/or a flight management system ("FMS"), all of which are known to those skilled in the art. As embodied herein, the navigation data source 110 may provide navigation data to the ASP 130 for subsequent processing as discussed herein.

The motion tracking data source 120 could be comprised of any source(s) which provides data representative of a measurement of head position arising from the movement of a person's head such as, but not limited to, the movement of a pilot's head as he or she moves his or her head through a side-to-side movement while flying and looking at the scene outside of the aircraft. In some embodiments, the motion tracking data source 120 could be comprised of the motion tracking system disclosed by Zimmerman et al. in U.S. Pat. No. 7,961,117 entitled "System, Module, and Method for Creating a Variable FOV Image Presented on a HUD Combiner Unit," which is hereby incorporated herein by reference in its entirety.

The motion tracking data source 120 may be comprised of a helmet, stereo glasses, head-mounted displays (singularly, "HMD"), or some article worn on the head of a viewer may be used in conjunction with one or more sensors or sensing devices installed or placed in the cockpit for capturing the movement or motion of the viewer's head. The motion tracking data source 120 could also be comprised of a monocular or bi-ocular collimated display system, a micro display and backlight, and a low latency head tracking system. As data is captured by the sensor(s) or sensing device(s), data representative of a measurement of head position may be provided to the ASP 130 for subsequent processing as discussed herein.

In some embodiments, the ASP 130 may be comprised of any electronic data processing unit which executes software (i.e., computer instruction code) that could be stored, permanently or temporarily, in a digital memory storage device or a non-transitory computer-readable media, including, but not limited to, RAM, ROM, CD, DVD, hard disk drive, diskette, solid-state memory, PCMCIA or PC Card, secure digital cards, and compact flash cards. The ASP 130 may be driven by the execution of software or computer instruction code containing algorithms developed for the specific functions embodied herein. The ASP 130 may be, or may include, one or more application-specific integrated circuits (ASICs) customized for the embodiments disclosed herein. Common examples of electronic data processing units are microprocessors, Digital Signal Processors (DSPs), Programmable Logic Devices (PLDs), and Programmable Gate Arrays (PGAs); however, for the embodiments herein, the term "processor" is not limited to such processing units and its meaning is not intended to be construed narrowly. For instance, the processor could also be comprised of a combination of electronic data processing units. As embodied herein, the ASP 130 could be a processor(s) used by or in conjunction with any other system of the aircraft including, but not limited to, the navigation data source 110, the image capture device 140, the motion tracking data source 120, and the display system 150, or any combination thereof.

The ASP 130 may be programmed or configured to receive as input data representative of information obtained from various systems and/or sources including, but not limited to, the navigation data source 110, the image capture device 140, the motion tracking data source 120. As embodied herein, the terms "programmed" and "configured" are synonymous. The ASP 130 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a wired data bus, through a wireless network, or as a signal received and/or transmitted by the ASP 130 via a physical or a virtual computer port. The ASP 130 may be programmed or configured to execute one or both of the methods discussed in detail below and provide output data to various systems and/or units including, but not limited to, the display system 150.

In some embodiments, the image capture device 140 could be comprised of one or more steerable image capture devices 140 that are mounted to an aircraft. The image capture device 140 could be forward-looking and classified as "active sensors" and/or "passive sensors." Examples of active sensors include those used in Millimeter Wave Radar systems, and examples of passive sensors include infrared cameras for detecting infrared radiation emanating from the scene or low-light, non-visible, near-infrared radiation such as that emitted from many runway and landing lights in the scene. The image capture device 140 could be employed in an enhanced vision system ("EVS") for generating an enhanced image that is displayed to a viewer. The image capture device 140 could provide image data to the ASP 130 for subsequent processing as discussed herein, where each image capture device 140 may be steered in response to and in compliance with the steering command as discussed herein.

In some embodiments, the display system 150 could be any system comprised of at least one display unit configured to present images such as, but not limited to, an enhanced image generated by the EVS, a synthetic image generated by a synthetic vision system ("SVS"), and/or a combined EVS-SVS. The display unit could be comprised of, but not limited to, a Head-Up Display ("HUD"), Head-Down Display ("HDD"), Primary Flight Display, Navigation Display, Multi-Purpose Control Display Unit, EICAS, Electronic Centralized Aircraft Monitor, Multi-Function Display, Side Displays, and Data Link Control Display Unit. Although the following discussion is drawn toward display units physically installed in an aircraft, the embodiments disclosed herein may be applied to portable electronic devices configured with displays (e.g., laptop computers, electronic flight bags, handheld devices, touch screen devices, notebooks, tablets, or user-wearable devices such as head mounted displays).

Typically, the HUD is transparent and mounted in front of the pilot at windshield level and directly in the pilot's out the windshield, forward (along aircraft boresight) field of vision, and the HDD is mounted to an aircraft's flight instrument panel located in front of a pilot and below the windshield and the pilot's out the windshield field of vision. The HUD is advantageous because it permits the pilot to keep his or her eyes "outside the cockpit" while the display unit provides an image and/or flight information to the pilot. As embodied herein, the display system 150 could receive enhanced image data from the ASP 130 for subsequent processing as discussed herein.

Figure 2:
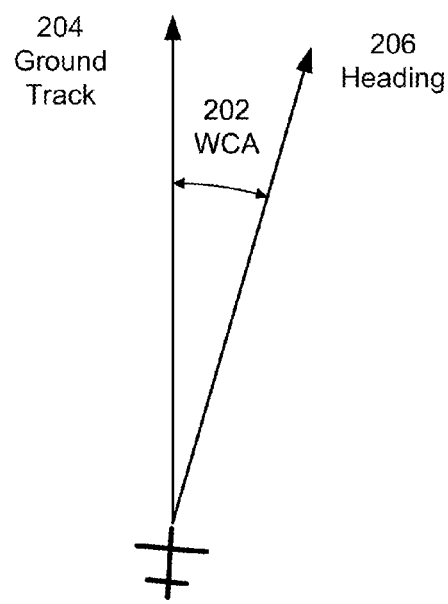
FIG. 2 illustrates a wind correction angle.

Referring now to FIG. 2, a wind correction angle ("WCA") 202 is illustrated. Known to those skilled in the art, the WCA 202 may be the difference between an aircraft's ground track 204 and the aircraft's heading 206. The WCA 202 has been employed for positioning a heading-based image within a track-based image as disclosed by Barber in U.S. Pat. No. 8,831,798 entitled "Systems and Methods for Positioning a Heading-Based Image within a Track-Based Image and for Generating Steering Commands to a Steerable Forward-Looking Image Capture Device of an Enhanced Vision System," which is hereby incorporated herein by reference in its entirety. The WCA 202 may provide a basis for generating steering data as disclosed herein, where the steering data may be sent to at least one steerable image capture device 140.

Figures 3A, 3B, 3C:
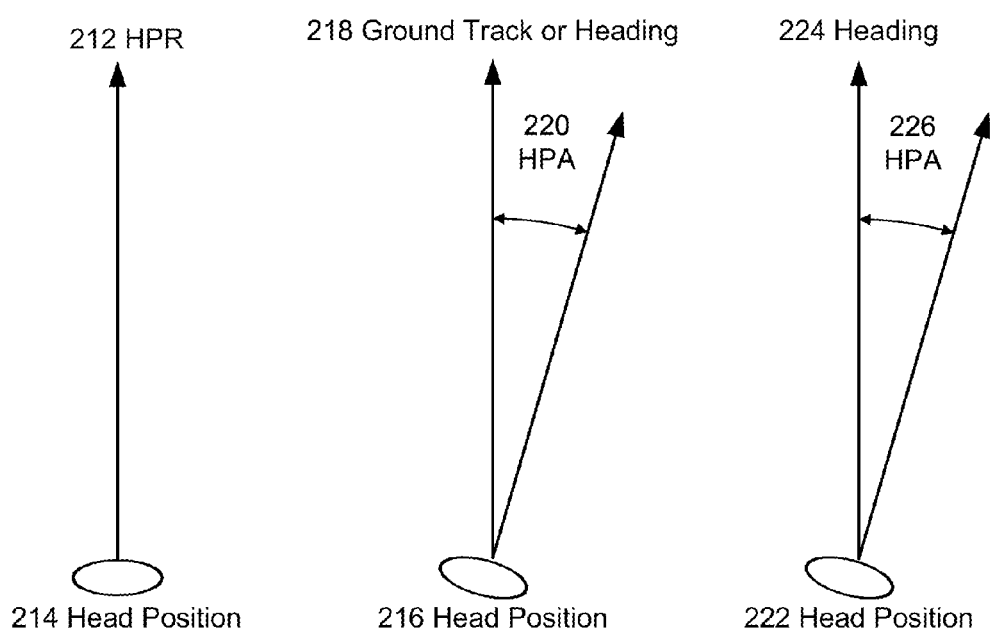
FIG. 3A depicts a head position reference ("HPR") established for a viewer's head position.
FIG. 3B depicts a viewer's head position turned at a head position angle ("HPA") from the HPR that is comprised of aircraft ground track or heading for an aircraft located on the ground.
FIG. 3C depicts a viewer's head position displaced by an HPA from the HPR that is comprised of aircraft heading for an aircraft in flight.

Referring to FIG. 3A, a head position reference ("HPR") 212 has been established for a viewer's head position 214. For the purpose of illustration, the viewer's head position is positioned straight ahead without the viewer turning his or her head left or right.

Referring to FIG. 3B, the aircraft is assumed to be located on the ground. The HPR 212 of head position 216 is coincidental with the ground track or heading 218. As shown, the viewer has turned his or her head to the right at a head position angle ("HPA") 220 as measured from the ground track or heading 218.

Referring to FIG. 3C, the aircraft is assumed to be located in flight. The HPR 212 of head position 222 is coincidental with the heading 224. As shown, the viewer has turned his or her head to the right at a HPA 226 as measured from the heading 224. Although the preceding discussion has been drawn to a viewer turning his or her head to the right, the disclosures herein apply equally to a viewer turning his or her head to the left.

Figure 4:
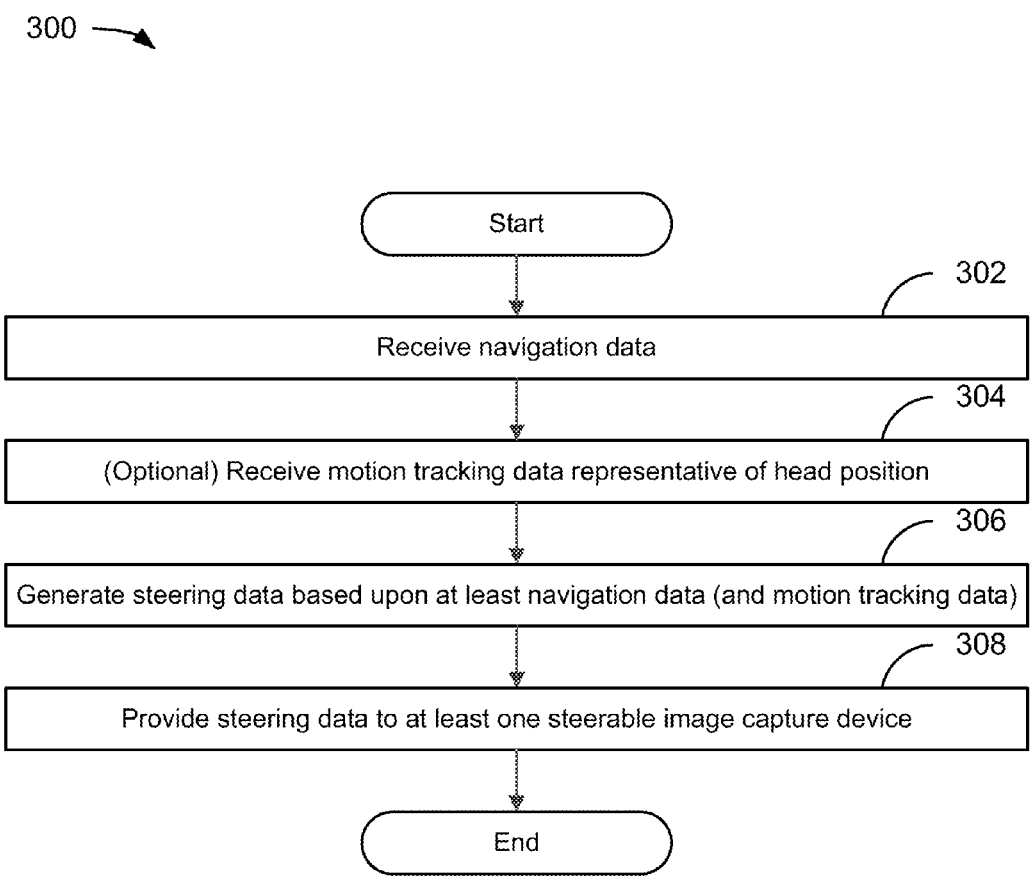
FIG. 4 depicts a flowchart of an embodiment of a method for generating steering commands for a forward-looking image capture device.

FIG. 4 depicts flowchart 300 for providing an example for generating a steering command for at least one forward-looking image capture device (e.g., 140), where the ASP 130 may be programmed or configured with instructions corresponding to the following modules. In some embodiments, the ASP 130 may be a processor or a combination of processors found in the source of navigation data 110, the motion tracking data source 120, the image capture device 140, an EVS, the display system 150, and/or any other system suitable for performing the task. Also, the ASP 130 may be a processor of a module such as, but not limited to, a printed circuit card having one or more input interfaces (e.g., virtual or physical computer ports) to facilitate data communications with the ASP 130, i.e., the receiving and providing of data (e.g., one or more electrical or optical signals including data and/or being indicative of data). For the accomplishment of the following modules embodied in flowchart 300, the receiving of data is synonymous and/or interchangeable with the retrieval of data, and the providing of data is synonymous and/or interchangeable with the making available, supplying, and/or sending of data.

The method of flowchart 300 begins with module 302 with the ASP 130 receiving of navigation data representative of one or more measurements of aircraft direction from the navigation data source 110. In one embodiment, one measurement of aircraft direction could be comprised of a measured value of the WCA. In another embodiment, measurements of aircraft direction could include measurements of aircraft ground track and aircraft heading from which the measured value of WCA could be determined.

The flowchart 300 continues with an optional module 304 including the ASP 130 receiving of motion tracking data from the motion tracking data source 120. The motion tracking data could be representative of a measurement of head position (e.g., HPA), where the head position could be indicative of positions resulting from side-to-side head motion as measured from a HPR (and likely where tracked subject is looking). In one embodiment in which motion tracking data is received, a measurement of aircraft direction could be comprised of a measurement of aircraft heading or a measurement of aircraft ground track when the aircraft is on the ground. In some embodiments where motion tracking data is received, the measurement of aircraft direction is comprised of a measurement of aircraft heading when the aircraft is in flight.

The flowchart 300 continues with module 306 including the generating of steering data as a function of at least the navigation data. The steering data could be representative of a steering command commensurate to an angular difference. In one embodiment, the angular difference could be comprised of the measurement of the WCA to provide steering data representing the difference between the heading and ground track. In another embodiment, the function for generating the steering data could include the motion tracking data, and the angular difference could be comprised of the measurement of head position to provide steering data representing the direction in which the pilot is looking in his or her field of vision.

The flowchart 300 continues with module 308 including the providing of the steering data to one or more image capture devices 140. Upon receiving the steering data, each forward-looking image capture device could be steered in response to and in compliance with the steering command. As such, each forward-looking image capture device may be set in a position from which image data may be acquired in a direction corresponding to the angular difference comprised of the measurement of the WCA or the measurement of head position. As embodied herein, a forward-looking image capture device may be steered by motorized means (e.g., a linear or rotary actuator) or by electronic means (e.g., a phased array antenna). The image data is comprised of enhanced vision system image data representative of an image presentable to at least one viewer. Then, the method of flowchart 300 ends.

It should be noted that the method steps described above may be embodied in computer-readable media stored in a non-transitory computer-readable medium as computer software. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating a sensor steering command for at least one forward-looking image capture device, comprising:
   a source of motion tracking data representative of information corresponding to a first angular measurement of head position of a pilot inside an aircraft;
   a source of navigation data representative of information corresponding to a second angular measurement between aircraft heading and aircraft track;
   an enhanced vision system comprised of at least one steerable, forward-looking device comprised of a sensor configured to capture non-visible radiation; and
   an avionics system processor including at least one processor coupled to a non-transitory processor-readable medium storing processor-executable code and configured to:
      receive the motion tracking data when the aircraft is on the ground,
      receive the navigation data when the aircraft is in flight,
      generate steering data as a function of the motion tracking data or the navigation data, where
         the steering data is representative of a steering command commensurate to the first angular measurement when the aircraft is on the ground and the second angular measurement when the aircraft is in flight, and
      provide the steering data to the at least one steerable, forward-looking device, whereby
         the at least one steerable, forward-looking device is steered in response to and in compliance with the steering command, thereby
            placing the sensor of the at least one forward-looking device into a position corresponding to the first angular measurement or the second angular measurement to capture the non-visible radiation of a ground scene or an in-flight scene, respectively.

2. The system of claim 1, wherein the avionics system processor is a processor of at least one aircraft system.

3. The system of claim 2, wherein the at least one aircraft system is comprised of at least one of the source of motion tracking data, the source of navigation data, and the enhanced vision system.

4. The system of claim 1, wherein the second angular measurement between aircraft heading and aircraft track is a measurement of wind correction angle.

5. The system of claim 1, wherein an image of the ground scene or the in-flight scene represented in the non-visible radiation is presented to the pilot via the enhanced vision system.

6. A device for generating a sensor steering command for at least one forward-looking image capture device, comprising:
   an avionics system processor including at least one processor coupled to a non-transitory processor-readable medium storing processor-executable code and configured to:
      receive motion tracking data from a source of motion tracking data representative of information corresponding to a first angular measurement of head position of a pilot inside an aircraft when the aircraft is on the ground;
      receive navigation data from a source of navigation data representative of information corresponding to a second angular measurement between aircraft heading and aircraft track when the aircraft is in flight;
      generate steering data as a function of the motion tracking data or the navigation data, where
         the steering data is representative of a steering command commensurate to the first angular measurement when the aircraft is on the ground and the second angular measurement when the aircraft is in flight; and
      provide the steering data to at least one steerable, forward-looking device of an enhanced vision system and comprised of a sensor configured to capture non-visible radiation, whereby
         the at least one steerable, forward-looking device is steered in response to and in compliance with the steering command, thereby
            placing the sensor of the at least one forward-looking device into a position corresponding to the first angular measurement or the second angular measurement to capture the non-visible radiation of a ground scene or an in-flight scene, respectively.

7. The device of claim 6, wherein the avionics system processor is a processor of at least one aircraft system.

8. The device of claim 7, wherein the at least one aircraft system is comprised of at least one of the source of motion tracking data, the source of navigation data, and the enhanced vision system.

9. The device of claim 6, wherein the second angular measurement between aircraft heading and aircraft track is a measurement of wind correction angle.

10. The device of claim 6 wherein an image of the ground scene or the in-flight scene represented in the non-visible radiation is presented to the pilot via the enhanced vision system.

11. A method for generating a sensor steering command for at least one forward-looking image capture device, comprising:
   receiving, by an avionics system processor including at least one processor coupled to a non-transitory processor-readable medium storing processor-executable code, motion tracking data from a source of motion tracking data representative of information corresponding to a first angular measurement of head position of a pilot inside an aircraft when the aircraft is on the ground;
   navigation data from a source of navigation data representative of corresponding to a second angular measurement between aircraft heading and aircraft track when the aircraft is in flight;
   generating steering data as a function of the motion tracking data or the navigation data, where
      the steering data is representative of a steering command commensurate to the first angular measurement when the aircraft is on the ground and the second angular measurement when the aircraft is in flight; and
   providing the steering data to at least one steerable, forward-looking device of an enhanced vision system and comprised of a sensor configured to capture non-visible radiation, whereby
      the at least one steerable, forward-looking device is steered in response to and in compliance with the steering command, thereby
         placing the sensor of the at least one forward-looking device into a position corresponding to the first angular measurement or the second angular measurement to capture the non-visible radiation of a ground scene or an in-flight scene, respectively.

12. The method of claim 11, wherein the avionics system processor is a processor of at least one aircraft system.

13. The method of claim 12, wherein the at least one aircraft system is comprised of at least one of the source of motion tracking data, the source of navigation data, and the enhanced vision system.

14. The method of claim 11, wherein the second angular measurement between aircraft heading and aircraft track is a measurement of wind correction angle.

15. The method of claim 11, wherein an image of the ground scene or the in-flight scene represented in the non-visible radiation is presented to the pilot via the enhanced vision system.

\* \* \* \* \*